(12) United States Patent
Yamanaka

(10) Patent No.: US 12,395,736 B2
(45) Date of Patent: Aug. 19, 2025

(54) IMAGE PROCESSING APPARATUS, CONTROL METHOD THEREFOR, AND STORAGE MEDIUM

(71) Applicant: CANON KABUSHIKI KAISHA, Tokyo (JP)

(72) Inventor: Yohei Yamanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 18/408,911

(22) Filed: Jan. 10, 2024

(65) Prior Publication Data

US 2024/0251164 A1 Jul. 25, 2024

(30) Foreign Application Priority Data

Jan. 19, 2023 (JP) .................................. 2023-006713

(51) Int. Cl.
*H04N 23/68* (2023.01)
*G06T 7/20* (2017.01)

(52) U.S. Cl.
CPC ............ *H04N 23/683* (2023.01); *G06T 7/20* (2013.01); *H04N 23/6812* (2023.01); *G06T 2207/20081* (2013.01); *G06T 2207/20212* (2013.01)

(58) Field of Classification Search
CPC .. H04N 23/683; H04N 23/6812; H04N 23/60; H04N 5/262; H04N 23/70; G06T 7/20; G06T 2207/20081; G06T 2207/20212; G06T 5/20; G06T 5/70; G06T 7/254; G06T 2207/10016; G06T 2207/20201
See application file for complete search history.

(56) References Cited

U.S. PATENT DOCUMENTS

| | | | |
|---|---|---|---|
| 8,264,552 B2* | 9/2012 | Kobayashi | H04N 23/70 348/222.1 |
| 9,609,221 B2* | 3/2017 | Kim | H04N 23/6845 |
| 2010/0225772 A1* | 9/2010 | Murayama | G06T 5/70 348/208.4 |
| 2012/0294512 A1* | 11/2012 | Matsuda | G06T 3/4053 382/155 |
| 2014/0355870 A1* | 12/2014 | Venkataraman | G06T 7/50 382/154 |
| 2018/0070023 A1* | 3/2018 | Oh | H04N 5/2625 |

FOREIGN PATENT DOCUMENTS

JP H05-276431 A 10/1993

* cited by examiner

*Primary Examiner* — Lin Ye
*Assistant Examiner* — Tuan H Le
(74) *Attorney, Agent, or Firm* — Venable LLP

(57) ABSTRACT

An image processing apparatus includes a first generation unit configured to add moving object blur to at least one image data extracted from moving image data to generate first image data, a second generation unit configured to synthesize a plurality of image data extracted from the moving image data to generate second image data, a selection unit configured to select the first generation unit and the second generation unit based on at least one of information regarding an image capturing device that has captured the moving image data and information regarding a subject, and a recording unit configured to record the first image data or the second image data generated by the first generation unit or the second generation unit selected by the selection unit.

13 Claims, 4 Drawing Sheets

IMAGE PROCESSING APPARATUS, CONTROL METHOD THEREFOR, AND STORAGE MEDIUM

BACKGROUND OF THE INVENTION

Field of the Invention

The present invention relates to an image processing apparatus that can generate a still image from a moving image.

Description of the Related Art

FIG. 4 illustrates a schematic configuration of a known image capturing device that can record a still image during capturing of a moving image. In FIG. 4, for example, an image signal photoelectrically converted by an image capturing unit 401 including an image capturing element such as a CMOS sensor and an optical system is sent to a camera signal processing unit 403 via an A/D conversion unit 402.

In the image data subjected to signal processing by the camera signal processing unit 403, still image data for a still image is recorded in a still image recording medium 404 including, for example, a semiconductor storage device. On the other hand, moving image data is subjected to signal processing by a video signal processing unit 405, and then recorded in a moving image recording medium 406 such as a magnetic tape, a semiconductor memory, or a recordable DVD disk.

Furthermore, output of the video signal processing unit 405 is output to a display control unit 407 and displayed on a liquid crystal display (LCD) 408, which is a display device. The LCD 408 displays still image data recorded on the still image recording medium 404 and moving image data recorded on the moving image recording medium 406, and also has a function as a viewfinder. Therefore, the LCD 408 can display moving image data captured by the image capturing unit 401 before start of recording, display moving image data being captured, and display still image data for a check of an image taken in before being recorded on the still image recording medium 404.

Note that the image capturing device illustrated in FIG. 4 is provided with a central processing unit (CPU) 409, and various operations are controlled in accordance with an application program stored in a memory 410. These operations are executed in accordance with various operation signals input from an operation unit 411 operated by a user.

Recent digital cameras can capture a still image while recording a moving image. At this time, when a still image recording button is pressed during moving image capturing, one frame of moving image data transmitted to the camera signal processing unit 403 is extracted as still image data. Then, this still image data is recorded in the still image recording medium 404.

Here, when a still image is captured during recording of a moving image, there is a case where it is desired to give a relatively long exposure time to capture the still image, that is, it is desired to perform long second exposure. In this case, when the exposure time required for the still image is longer than the time of one frame of the moving image, there is a problem that the moving image data is interrupted and becomes a discontinuous moving image.

As a measure against such a problem, Japanese Patent Laid-Open No. 5-276431 discloses a technique of generating a still image having an exposure time shorter than an exposure time required for the still image from a frame image of a moving image, and synthesizing a plurality of still images having the short exposure time to obtain one still image. This enables still image data corresponding to long second exposure to be synthesized and output without interruption of moving image data.

However, in the method disclosed in Japanese Patent Laid-Open No. 5-276431, when vibration is applied to the video camera during capturing of moving image data, a deviation in the angle of view occurs in a plurality of still images to be synthesized due to a deviation in the angle of view between frame images. Therefore, there is a case where one still image obtained by synthesizing the plurality of still images becomes a blurred photograph with camera shake.

On the other hand, for the purpose of capturing a still image with a long second exposure time, there is a case where it is desired to evoke a dynamic feeling by generating appropriate blurring in a subject. In this case, if the number of still images to be synthesized is reduced for the purpose of avoiding occurrence of blurring in the image due to image synthesis, there is a case where the target dynamic feeling is not achieved.

SUMMARY OF THE INVENTION

The present invention has been made in view of the above-described problems, and provides an image processing apparatus that can generate an image appropriately evoking a dynamic feeling when generating a still image from a moving image.

According to a first aspect of the present invention, there is provided an image processing apparatus comprising: at least one processor or circuit configured to function as: a first generation unit configured to add moving object blur to at least one image data extracted from moving image data to generate first image data; a second generation unit configured to synthesize a plurality of image data extracted from the moving image data to generate second image data; a selection unit configured to select the first generation unit and the second generation unit based on at least one of information regarding an image capturing device that has captured the moving image data and information regarding a subject; and a recording unit configured to record the first image data or the second image data generated by the first generation unit or the second generation unit selected by the selection unit.

According to a second aspect of the present invention, there is provided a method for controlling an image processing apparatus including a first generation unit configured to add moving object blur to at least one image data extracted from moving image data to generate first image data, and a second generation unit configured to synthesize a plurality of image data extracted from the moving image data to generate second image data, the method comprising: selecting the first generation unit and the second generation unit based on at least one of information regarding an image capturing device that has captured the moving image data and information regarding a subject; and recording the first image data or the second image data generated by the first generation unit or the selected second generation unit.

Further features of the present invention will become apparent from the following description of exemplary embodiments with reference to the attached drawings.

DESCRIPTION OF THE EMBODIMENTS

Figure 1:
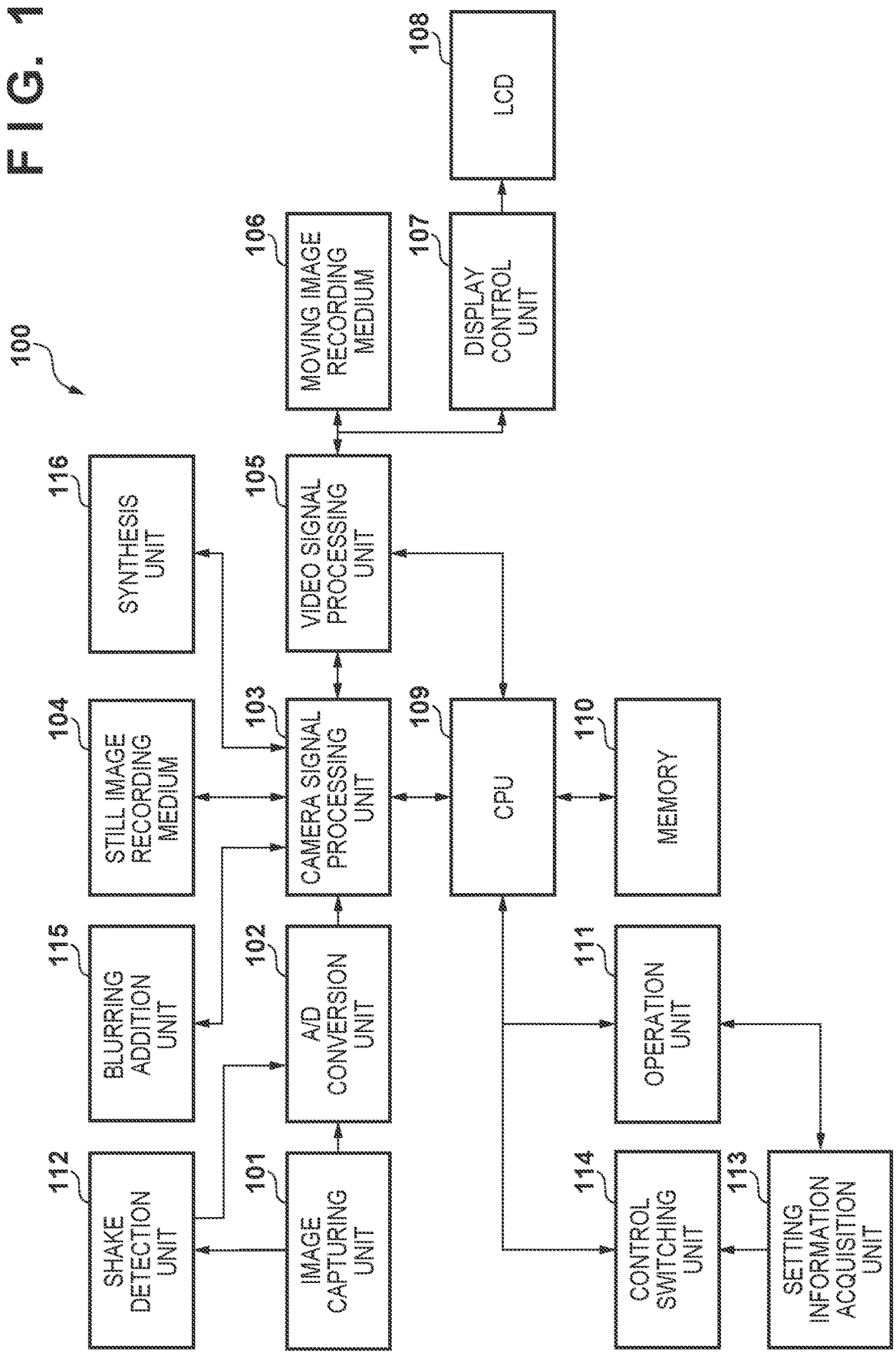
FIG. 1 is a view illustrating a schematic configuration of an image capturing device in a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in the description of the present embodiment, vibration applied to an image capturing device from the outside such as camera shake shall be called "shake", and subject position deviation between frames of a captured image occurring during the exposure period or a blur of the subject image shall be called "blurring".

First Embodiment

FIG. 1 is a view illustrating a schematic configuration of an image capturing device 100, which is the first embodiment of the image processing apparatus of the present invention.

In FIG. 1, for example, an image signal photoelectrically converted by an image capturing unit 101 including an image capturing element including a CCD or a CMOS sensor and an optical system is sent to a camera signal processing unit 103 via an A/D conversion unit 102.

Among the image data subjected to signal processing by the camera signal processing unit 103, still image data for a still image is recorded in a still image recording medium 104 including a semiconductor storage device, for example. On the other hand, moving image data is subjected to signal processing by the video signal processing unit 105, and then recorded in a moving image recording medium 106 including, for example, a semiconductor memory or a recordable DVD disk.

Furthermore, output of the video signal processing unit 105 is output to a display control unit 107 and displayed on an LCD 108, which is a display device. The LCD 108 displays still image data recorded on the still image recording medium 104 and moving image data recorded on the moving image recording medium 106, and also functions as a viewfinder.

A CPU 109 including a microcomputer controls the entire image capturing device 100 by executing an application program stored in a memory 110. Control operation of the CPU 109 is executed in accordance with various operation signals input from an operation unit 111 operated by the user.

In addition to the above configuration, the image capturing device 100 of the present embodiment further includes a shake detection unit 112, a setting information acquisition unit 113, a control switching unit 114, a blurring addition unit 115, and a synthesis unit 116.

The shake detection unit 112 detects a shake applied to the image capturing device 100. The blurring addition unit 115 performs blurring addition to a moving object using deep learning. The synthesis unit 116 synthesizes a plurality of image data. The control switching unit 114 reads image data recorded on the moving image recording medium 106, and switches (selects) whether to perform blurring addition to a moving object by the blurring addition unit 115 or to synthesize a plurality of image data by the synthesis unit 116 based on the setting information acquired by the setting information acquisition unit 113. Here, the setting information of the setting information acquisition unit 113 includes information such as a shutter speed, a frame rate, shake information of a gyro sensor, and predetermined subject information described later.

Figure 2:
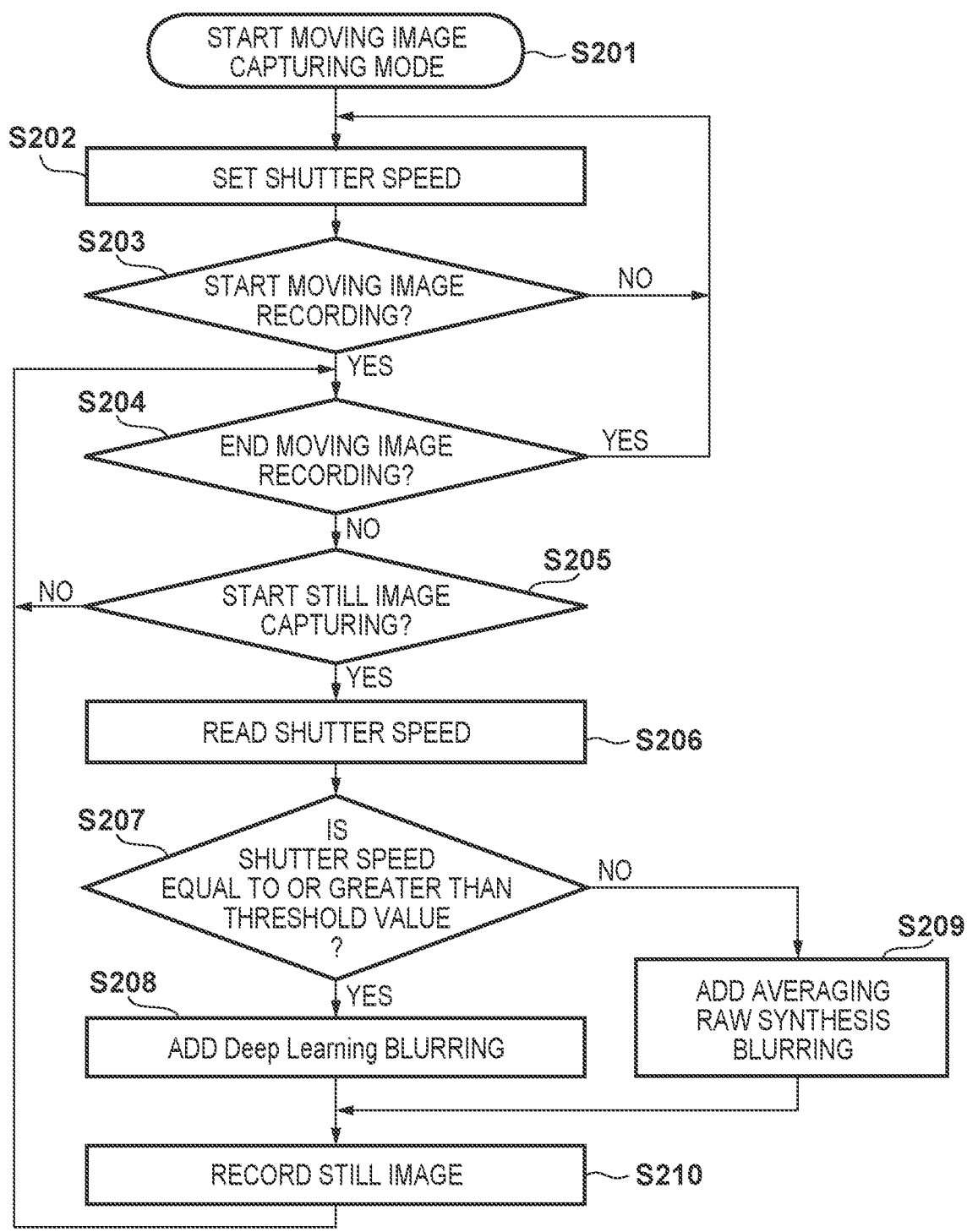
FIG. 2 is a flowchart for explaining an operation of the image capturing device in the first embodiment.

Next, FIG. 2 is a flowchart showing the operation of the image capturing device 100 illustrated in FIG. 1.

First, in step S201, the CPU 109 sets the image capturing device 100 to the moving image capturing mode by a signal from the operation unit 111 generated by operating a mode setting button (not illustrated) of the image capturing device. At this time, the image signal photoelectrically converted by the image capturing unit 101 is sent to the camera signal processing unit 103 via the A/D conversion unit 102.

In step S202, the setting information acquisition unit 113 acquires the shutter speed for still image capturing input via the operation unit 111, and the CPU 109 sets this shutter speed as the shutter speed for still image capturing.

In step S203, the CPU 109 determines whether or not a moving image capturing start button (not illustrated) has been pressed. If the moving image capturing start button has been pressed, the CPU 109 starts capturing of moving image data and recording of the moving image data into the moving image recording medium 106, then proceeds with the processing to step S204, and otherwise returns the processing to step S202.

In step S204, the CPU 109 determines whether or not end of the moving image capturing has been input by the user. If the end of the moving image capturing has not been input, the CPU 109 proceeds with the processing to step S205. If the end of the moving image capturing has been input, the CPU 109 returns the processing to step S202, and receives again the setting of the shutter speed for the still image capturing.

In step S205, the CPU 109 determines whether or not a still image capturing button (not illustrated) has been pressed by a user operation during moving image capturing. If the still image capturing button has been pressed, the CPU 109 proceeds with the processing to step S206, otherwise returns the processing to step S204, and again determines whether or not the end of the moving image capturing has been input.

In step S206, the CPU 109 reads the shutter speed for the still image capturing acquired in step S202.

In step S207, the CPU 109 determines whether or not the shutter speed for still image capturing is equal to or greater than a threshold. Based on this determination, the CPU 109 causes the control switching unit 114 to switch between the processing using the blurring addition unit 115 and the processing using the synthesis unit 116. If the shutter speed is equal to or greater than the predetermined threshold, the CPU 109 proceeds with the processing to step S208, and otherwise (if less than the threshold), the CPU 109 proceeds with the processing to step S209.

In step S208, the CPU 109 causes the video signal processing unit 105 to read (extract) one or more image data recorded on the moving image recording medium 106 after the timing when the still image capturing button is pressed. The read image data is input to the blurring addition unit 115 via the camera signal processing unit 103. Based on data learned in advance by a learning method such as deep learning, the blurring addition unit 115 estimates a moving subject in the image data, performs processing of adding moving object blur to the moving subject, and generates one image data.

In step S209, while performing moving image capturing, the CPU 109 reads (extracts), to the video signal processing unit 105, two or more image data recorded on the moving image recording medium 106 after the timing when the still image capturing button is pressed. Then, the CPU 109 inputs a plurality of image data to the synthesis unit 116 via the camera signal processing unit 103, and synthesizes the plurality of image data, thereby generating one image data.

For example, when the shutter speed is set to 1 second and the frame rate is set to 30 fps, the CPU 109 performs synthesis of 30 image data. The synthesis processing here may be addition processing in each pixel of the plurality of image data, or may be averaging processing in which the plurality of image data are added and then divided by the number of image data. In the case of the addition processing, each of the image data before the addition processing is multiplied by a predetermined negative gain value so that the one image data generated by the synthesis does not become bright. For example, as an example of setting of the negative gain, when the number of images to be added is 10, the signal of each of the image data becomes $\frac{1}{10}$ by multiplying by the gain value of $\frac{1}{10}$, and the image data after the addition processing becomes proper exposure.

In step S210, the CPU 109 records, on the still image recording medium 104, the image data generated by the blurring addition processing in step S208 or the synthesis processing in step S209.

In the present embodiment, regarding capturing of long second exposure when simultaneously recording moving image data and still image data, based on the shutter speed, the blurring addition method is switched to a method by deep learning processing or a method by image synthesis processing. This makes it possible to generate still image data that evokes a dynamic feeling due to blurring of the subject image while suppressing image synthesis in which the entire angle of view is deviated when recording still image data of long second exposure.

In the present embodiment, the control switching unit 114 switches the processing of leaving blurring in the image in accordance with the shutter speed, but the condition necessary for the switching is not limited to this. For example, shake information of the gyro sensor may be used as the switching condition. For example, the gyro sensor disposed in the shake detection unit 112 detects a shake amount due to camera shake or the like. The control switching unit 114 determines whether or not the detected shake amount is equal to or greater than a predetermined threshold stored in advance in the memory 110, and performs processing using the blurring addition unit 115 if the detected shake amount is equal to or greater than the threshold, and performs processing using the synthesis unit 116 if the detected shake amount is less than the threshold.

Second Embodiment

Figure 3:
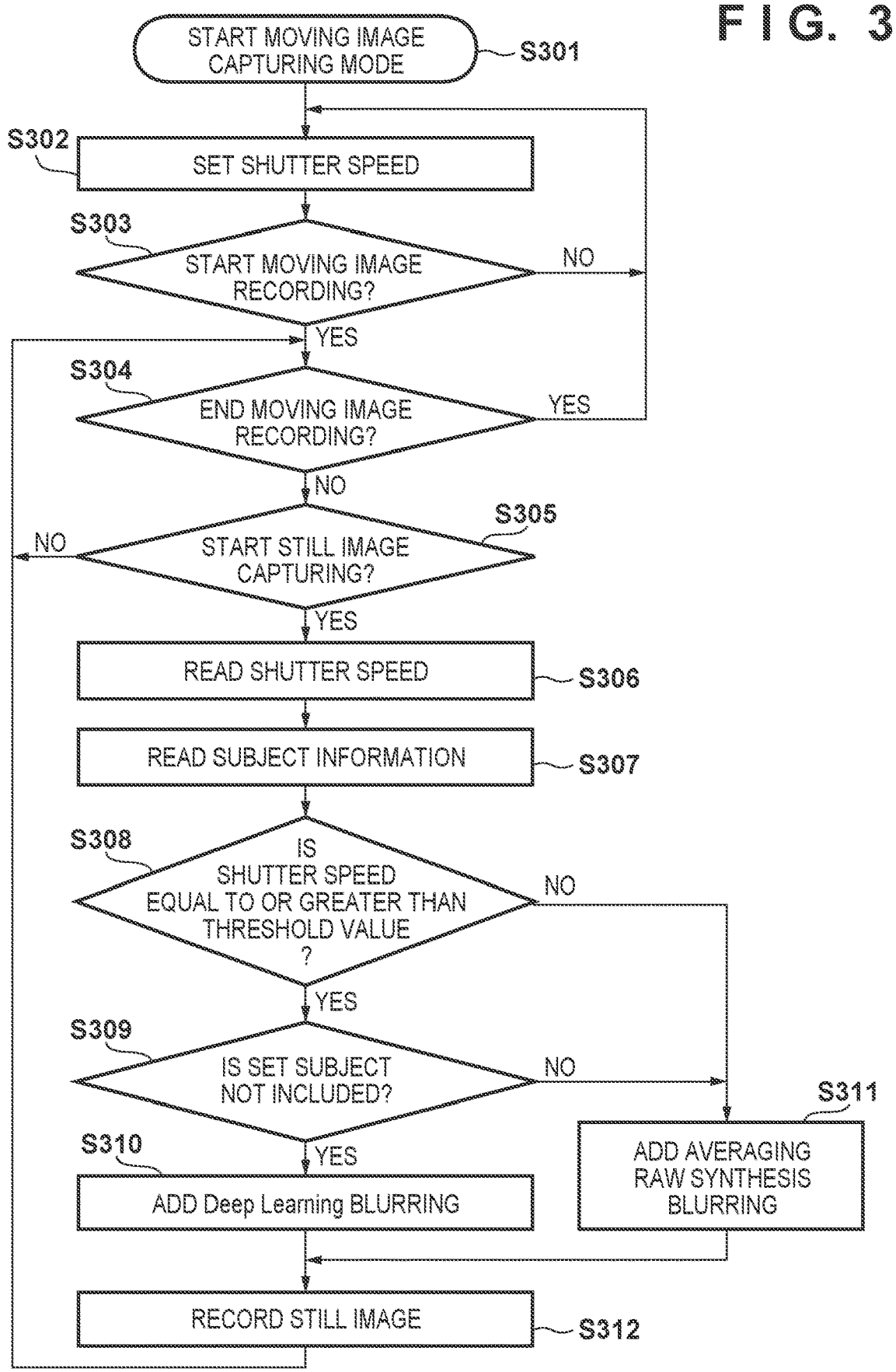
FIG. 3 is a flowchart for explaining an operation of an image capturing device in a second embodiment.
Figure 4:
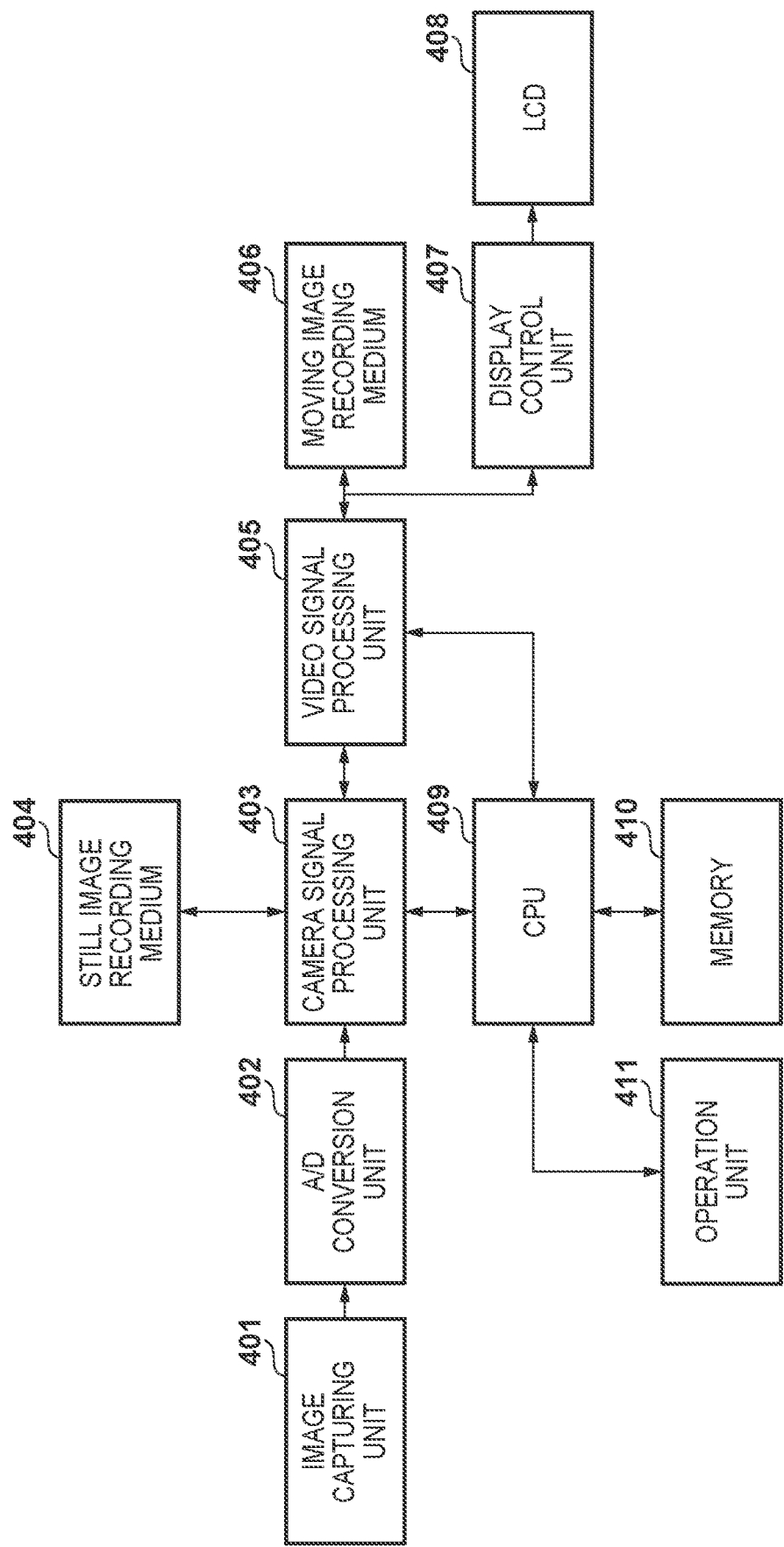
FIG. 4 is a schematic configuration diagram of a known image capturing device.

FIG. 3 is a flowchart showing the operation of the image capturing device in the second embodiment.

Note that in the second embodiment, the basic configuration of the image capturing device is identical to that of the image capturing device illustrated in FIG. 1 used in the description of the first embodiment. Note that in the second embodiment, the memory 110 stores in advance a subject (specific subject) whose accuracy of prediction results output from a prediction model is lower than a predetermined value, for example, a low-contrast texture, a subject that moves in a complicated manner such as a running person or an animal, or the like. In the present embodiment, when a subject with low accuracy of these prediction results exists in the screen, there is a possibility that a desired result is not obtained even if the blurring addition processing is performed, and therefore the blurring addition processing by the prediction model is not used.

First, in step S301, the CPU 109 sets the image capturing device 100 to the moving image capturing mode by a signal from the operation unit 111 generated by operating a mode setting button (not illustrated) of the image capturing device. At this time, the image signal photoelectrically converted by the image capturing unit 101 is sent to the camera signal processing unit 103 via the A/D conversion unit 102.

In step S302, the setting information acquisition unit 113 acquires the shutter speed for still image capturing input via the operation unit 111, and the CPU 109 sets this shutter speed as the shutter speed for still image capturing.

In step S303, the CPU 109 determines whether or not the moving image capturing start button (not illustrated) has been pressed. If the moving image capturing start button has been pressed, the CPU 109 starts capturing of moving image data and recording of the moving image data into the moving image recording medium 106, then proceeds with the processing to step S304, and otherwise returns the processing to step S302.

In step S304, the CPU 109 determines whether or not end of the moving image capturing has been input by the user. If the end of the moving image capturing has not been input, the CPU 109 proceeds with the processing to step S305. If the end of the moving image capturing has been input, the CPU 109 returns the processing to step S302, and receives again the setting of the shutter speed for the still image capturing.

In step S305, the CPU 109 determines whether or not a still image capturing button (not illustrated) has been pressed by the user operation at the time of moving image capturing. If the still image capturing button has been pressed, the CPU 109 proceeds with the processing to step S306, otherwise returns the processing to step S304, and again determines whether or not the end of the moving image capturing has been input.

In step S306, the CPU 109 reads the shutter speed for the still image capturing acquired in step S302.

In step S307, the CPU 109 reads, into the control switching unit 114, subject information with low accuracy of the prediction results output from the prediction model stored in advance in the memory 110.

In step S308, the CPU 109 determines whether or not the shutter speed for still image capturing is equal to or greater than a threshold. If the shutter speed is equal to or greater than the predetermined threshold, the CPU 109 proceeds with the processing to step S309, and otherwise, the CPU 109 proceeds with the processing to step S311.

In step S309, while performing moving image capturing, the CPU 109 reads, to the video signal processing unit 105, one or more image data recorded on the moving image recording medium 106 after the timing when the still image capturing button is pressed. Then, the CPU 109 recognizes the subject included in the read image data, and determines whether or not the subject stored in advance in the memory 110 is included in the image data. Based on this determination, the CPU 109 causes the control switching unit 114 to switch between the processing using the blurring addition unit 115 and the processing using the synthesis unit 116. If the subject stored in advance in the memory 110 is not included in the image data, the CPU 109 proceeds with the processing to step S310, and otherwise, the CPU 109 proceeds with the processing to step S311.

In step S310, the CPU 109 causes the video signal processing unit 105 to read one or more image data recorded on the moving image recording medium 106 after the timing when the still image capturing button is pressed. The read image data is input to the blurring addition unit 115 via the camera signal processing unit 103. Based on data learned in advance by a learning method such as deep learning, the blurring addition unit 115 estimates a moving subject in the image data, performs processing of adding moving object blur to the moving subject, and generates one image data.

In step S311, while performing moving image capturing, the CPU 109 reads, to the video signal processing unit 105, two or more image data recorded on the moving image recording medium 106 after the timing when the still image capturing button is pressed. Then, the CPU 109 inputs a plurality of two or more image data to the synthesis unit 116 via the camera signal processing unit 103, and synthesizes the plurality of image data, thereby generating one image data.

In step S312, the CPU 109 records, on the still image recording medium 104, the image data generated by the blurring addition processing in step S310 or the synthesis processing in step S311.

In the present embodiment, regarding capturing of long second exposure when simultaneously recording moving image data and still image data, based on the shutter speed and predetermined subject information set in advance, the blurring addition method is switched to a method by deep learning processing or a method by image synthesis processing. This makes it possible to generate still image data that evokes a dynamic feeling due to blurring of the subject image without performing blurring addition processing to the subject with low accuracy of the prediction results output from the prediction model.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-006713, filed Jan. 19, 2023, which is hereby incorporated by reference herein in its entirety.

What is claimed is:

1. An image processing apparatus comprising:
at least one processor or circuit configured to function as:
a first generation unit configured to add moving object blur to at least one image data extracted from moving image data to generate first image data;
a second generation unit configured to synthesize a plurality of image data extracted from the moving image data to generate second image data;
a selection unit configured to select the first generation unit and the second generation unit based on at least one of information regarding an image capturing device that has captured the moving image data and information regarding a subject; and
a recording unit configured to record the first image data or the second image data generated by the first generation unit or the second generation unit selected by the selection unit.

2. The image processing apparatus according to claim 1, wherein based on data learned in advance by deep learning, the first generation unit estimates a moving subject in extracted image data, and adds moving object blur to the moving subject.

3. The image processing apparatus according to claim 1, wherein the second generation unit adds a plurality of extracted image data and outputs one of the second image data.

4. The image processing apparatus according to claim 1, wherein the second generation unit averages a plurality of extracted image data and outputs one of the second image data.

5. The image processing apparatus according to claim 1, wherein the information regarding the image capturing device is at least one of a shutter speed, a frame rate, and a shake amount of the image capturing device.

6. The image processing apparatus according to claim 5, wherein the selection unit selects the first generation unit if the shutter speed is equal to or greater than a threshold, and selects the second generation unit if the shutter speed is less than the threshold.

7. The image processing apparatus according to claim 5, wherein the shake amount is detected by a gyro sensor disposed in the image capturing device.

8. The image processing apparatus according to claim 1, wherein the information regarding the subject is information as to whether or not a specific subject is included in extracted image data.

9. The image processing apparatus according to claim 8, wherein the specific subject is a subject whose accuracy of prediction results output from a prediction model is lower than a predetermined value.

10. The image processing apparatus according to claim 8, wherein the selection unit selects the first generation unit if the specific subject is not included in the extracted image data, and selects the second generation unit if the specific subject is included.

11. The image processing apparatus according to claim 1, further comprising an image capturing device configured to capture the moving image data.

12. A method for controlling an image processing apparatus including a first generation unit configured to add moving object blur to at least one image data extracted from moving image data to generate first image data, and a second generation unit configured to synthesize a plurality of image data extracted from the moving image data to generate second image data, the method comprising:
   selecting the first generation unit and the second generation unit based on at least one of information regarding an image capturing device that has captured the moving image data and information regarding a subject; and
   recording the first image data or the second image data generated by the first generation unit or the selected second generation unit.

13. A non-transitory computer-readable storage medium storing a program for causing a computer to function as each means of an image processing apparatus, the image processing apparatus comprising:
   at least one processor or circuit configured to function as:
   a first generation unit configured to add moving object blur to at least one image data extracted from moving image data to generate first image data;
   a second generation unit configured to synthesize a plurality of image data extracted from the moving image data to generate second image data;
   a selection unit configured to select the first generation unit and the second generation unit based on at least one of information regarding an image capturing device that has captured the moving image data and information regarding a subject; and
   a recording unit configured to record the first image data or the second image data generated by the first generation unit or the second generation unit selected by the selection unit.

* * * * *